(12) United States Patent
Dudziak

(10) Patent No.: US 8,929,849 B1
(45) Date of Patent: Jan. 6, 2015

(54) TEXT MESSAGING 911 CALLS USING PSAP TTY FUNCTIONALITY

(75) Inventor: Thaddeus J. Dudziak, Pleasanton, CA (US)

(73) Assignee: Cellco Partnership, Basking Ridge, NJ (US)

( * ) Notice: Subject to any disclaimer, the term of this patent is extended or adjusted under 35 U.S.C. 154(b) by 593 days.

(21) Appl. No.: 12/881,745

(22) Filed: Sep. 14, 2010

(51) Int. Cl.
*H04M 11/04* (2006.01)

(52) U.S. Cl.
USPC ........................................ 455/404.1; 455/466

(58) Field of Classification Search
CPC ..... H04W 76/007; H04W 8/245; H04W 4/22; H04W 4/12; H04W 4/02; H04W 64/00; H04W 4/14; H04M 1/72533
USPC ............. 455/404.1, 418, 404.2, 412.1, 414.2, 455/419, 420, 456.1, 456.2, 456.3, 456.5, 455/456.6, 466
See application file for complete search history.

(56) References Cited

U.S. PATENT DOCUMENTS

| 7,200,387 B1 * | 4/2007 | Ephraim et al. | 455/418 |
|---|---|---|---|
| 2005/0107066 A1 * | 5/2005 | Erskine et al. | 455/405 |
| 2006/0159234 A1 * | 7/2006 | Gault et al. | 379/37 |
| 2009/0264094 A1 * | 10/2009 | Smith | 455/404.2 |
| 2011/0009086 A1 * | 1/2011 | Poremba et al. | 455/404.1 |

* cited by examiner

*Primary Examiner* — Kiet Doan
*Assistant Examiner* — Alexander Yi

(57) ABSTRACT

An emergency message handling system may manage emergency SMS text messages sent by wireless mobile communication devices, such as to 911. Each message may be sent to an emergency call service having a TTY messaging system. The emergency message handling system may include an SMS network interface, a computer processing system, and a TTY network interface. The SMS network interface may be configured to receive the emergency SMS text messages. The computer processing system may include an SMS-To-TTY message converter configured to convert each of the emergency SMS text messages into TTY format. The TTY network interface may be configured to deliver each of the converted emergency SMS text messages in TTY format to the TTY messaging system of the emergency call service to which the emergency SMS text message was sent. Emergency TTY messages from the emergency call service to the wireless mobile communication device may similarly be delivered to the TTY network interface, converted by a TTY-To-SMS message converter in the computer processing system into SMS format, and sent by the SMS network interface to the wireless mobile communication device.

17 Claims, 5 Drawing Sheets

TEXT MESSAGING 911 CALLS USING PSAP TTY FUNCTIONALITY

BACKGROUND

1. Technical Field

This disclosure relates to emergency 911 calls from a wireless mobile communication device.

2. Description of Related Art

Wireless mobile communication devices, such as cell phones, are sometimes used to call emergency call services, such as public safety answering points (PSAPs) via 911.

Sometimes, however, the caller may be unable or unwilling to communicate verbally with the emergency call service. Some callers, for example, may be disabled and unable to speak. Other callers may be subject to conditions which may make speaking unsafe, such as being in the midst of a kidnapping or a robbery. Other users may not have enough time to deal with the delays which sometimes occur when placing a voice call to 911, such as delays caused by network congestion, dropped calls, and/or having to wait for a 911 operator. Still other users may be timid about the prospect of their voice call being recorded by 911, such as bystanders which might otherwise summons help. Still other users may be hearing impaired and unable to verbally communicate.

Text messaging may be a viable alternative in many of these circumstances. However, many 911 emergency call services lack the equipment necessary for receiving and responding to text messages and the funding for purchasing this equipment.

SUMMARY

An emergency message handling system may manage emergency SMS text messages sent by wireless mobile communication devices. Each message may be sent to an emergency call service having a TTY messaging system. The emergency message handling system may include an SMS network interface, a computer processing system, and a TTY network interface. The SMS network interface may be configured to receive the emergency SMS text messages. The computer processing system may include an SMS-To-TTY message converter configured to convert each of the emergency SMS text messages into TTY format. The TTY network interface may be configured to deliver each of the converted emergency SMS text messages in TTY format to the TTY messaging system of the emergency call service to which the emergency SMS text message was sent.

The emergency SMS text messages from the mobile communication devices may be designated by the mobile communication devices to be delivered to the telephone number 911.

The SMS network interface may be configured to receive the emergency SMS text messages from an SMPP gateway.

The SMPP gateway may be configured to receive the emergency SMS text messages from a short message service center (SMSC).

The wireless mobile communication devices may also send non-emergency SMS text messages to destinations other than an emergency call service. The SMS network interface and the computer processing system may be configured to process these non-emergency SMS text messages without them being converted into TTY format.

The TTY network interface may be configured to deliver the converted emergency SMS text messages in TTY format to a media gateway. The media gateway may be configured to deliver the converted emergency SMS text messages in TTY format to a router. The router may be configured to deliver the converted emergency SMS text messages in TTY format to a public switched telephone network (PSTN).

Each of the emergency SMS text messages may be processed by a mobile station controller (MSC). The TTY network interface may be configured to deliver each of the converted emergency SMS text messages in TTY format to the MSC which processed the emergency SMS text message.

The location of each of the wireless mobile communication devices may be determined by a location platform server (LPS). The computer processing system may be configured to request and obtain the location of each of the wireless mobile communication devices from the LPS and deliver this location information to the emergency call service to which the emergency SMS text message from each wireless mobile communication device was sent.

Each of the emergency call services may have an automatic location identification (ALI) system. The computer processing system may be configured to cause the location information to be sent to an ALI database (DB) within the emergency call service.

The computer processing system may be configured to determine which of several emergency call services is closest to the mobile communication device which sent the emergency SMS text message. The TTY network interface may be configured to deliver the converted emergency SMS text messages in TTY format to that emergency call service.

The SMS network interface may be configured to deliver the converted emergency TTY text messages to an SMPP gateway. The SMPP gateway may be configured to deliver the converted emergency TTY text messages to a short message service center (SMSC).

The TTY network interface may be configured to receive the emergency TTY text messages in TTY format from a media gateway.

The TTY network interface may be configured to receive each of the emergency TTY text messages in TTY format from the MSC.

The TTY network interface may be configured to receive emergency TTY text messages from each of the emergency call services. Each message may be sent by the emergency call service to one of the wireless mobile communication devices. The computer processing system may be configured to convert each received emergency TTY text message into SMS format. The SMS network interface may be configured to deliver each of the converted emergency TTY text messages in SMS format to the wireless mobile communication device to which it was sent.

The computer processing system may be configured to manage the connection between each of the wireless mobile communication devices and the emergency call service to which the emergency SMS text message from the wireless mobile communication device was sent. The management may include setting up the connection and/or maintaining an open connection between each wireless mobile communication device and the emergency call service to which the emergency SMS text message from the wireless mobile communication device was sent, even if a connection with the wireless mobile communication device is dropped.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings illustrate illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details which may be apparent or unnecessary may be omitted to save space or for a more effective presentation. Some embodiments may be practiced with additional components or steps and/or without all of the components or steps which are described.

Figure 1:
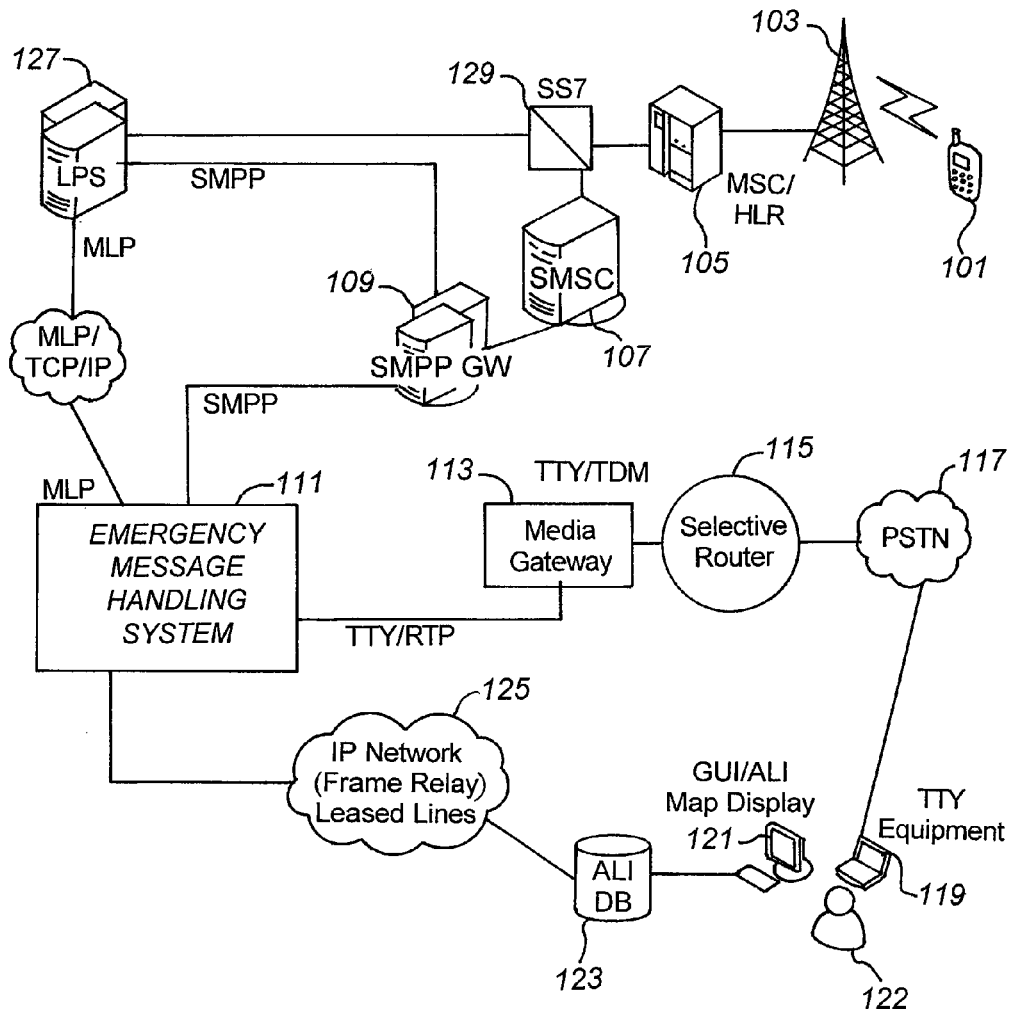
FIG. 1 is an example of a wireless network communication system which includes an emergency message handling system.

FIG. 1 is an example of a wireless network communication system which includes an emergency message handling system.

The wireless network communication system may include one or more wireless mobile communication devices, such as a cell phone 101. Other types of wireless mobile communication devices may be used in addition or instead, such as telematics devices, netbooks, and smart devices Each wireless mobile communication device may be configured to send and receive text messages, such as short message service (SMS) text messages. Each wireless mobile communication device may be configured to address each outgoing SMS text message to a phone number entered into the wireless mobile communication device. This may include, for example, receiving an outgoing emergency SMS text message from a user and addressing it to the emergency call service telephone number 911. Each wireless mobile communication device may also be configured to receive outgoing SMS text messages and to address them to non-emergency destinations, such as to friends and business contacts.

The wireless network communication system may include base stations distributed geographically, such as a base station 103. The wireless network communication system may be configured to cause a communication link to be established between each communicating wireless mobile communication device and a nearby base station.

The base stations, in turn, may be configured to communicate SMS text messages to a mobile station controller (MSC)/home location register (HLR) such as an MSC/HLR 105. Each MSC/HLR may be configured to deliver received SMS text messages to a short message service center (SMSC), such as an SMSC 107. Each SMSC, in turn, may be configured to deliver received SMS text messages to a short message peer-to-peer protocol (SMPP) gateway, such as an SMPP gateway 109. Each SMPP gateway may be configured to deliver the SMS text messages to an emergency message handling system, such as the emergency message handling system 111, using SMPP.

Figure 2:
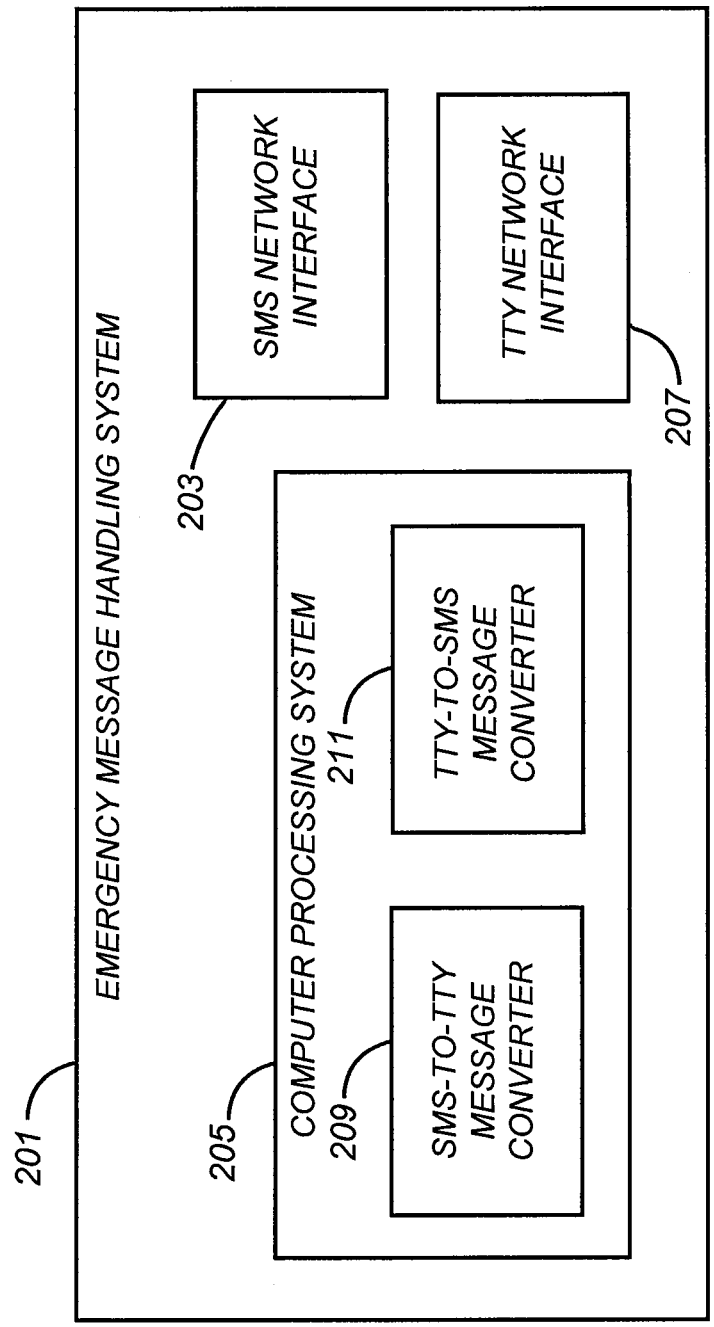
FIG. 2 is an example of an emergency message handling system.

FIG. 2 is an example of an emergency message handling system 201. The emergency message handling system 201 may be used as the emergency message handling system 111 illustrated in FIG. 1 or in connection with any other type of wireless network communication system. Similarly, the emergency message handling system 111 may be of a configuration different than what is illustrated in FIG. 2.

As illustrated in FIG. 2, the emergency message handling system 201 may include an SMS network interface 203, a computer processing system 205, and a teletypewriter (TTY) network interface 207.

The SMS network interface 203 may be configured to receive the emergency SMS text messages from the SMPP gateways, such as from the SMPP gateway 109. The SMS network interface 203 may also be configured to receive non-emergency SMS text messages from the same as well as other gateways.

The computer processing system 205 may include an SMS-to-TTY message converter 209 which may be configured to convert each of the emergency SMS text messages into TTY format.

The computer processing system 205 may be configured to determine which of several emergency call services is closest to the mobile communication device which sent the emergency SMS text message and to cause the TTY network interface 207 to deliver the converted emergency SMS text message in TTY format to this closest emergency call service. The computer processing system 205 may be configured to do so by obtaining the address of the mobile communication from a location platform server (LPS), such as an LPS 127.

The LPS 127 may be configured to seek this information from the MSC/HLR 105, communicating through a switch, such as a switch 129. The MSC/HLR 105 may provide this information in response.

The degree of accuracy in the location information may vary. For example, the location information may be coarse and based only on the location of the base station which has established a communication link with the wireless mobile communication device, such as the location of the base station 103. For a more precise longitude and latitude, the MSC/HLR may be configured to communicate with the wireless mobile communication device, such as the cell phone 101, and seek its location based on a GPS receiver which may be contained within the wireless mobile communication device, based on triangulation technology, and/or based on other technology. Considerations other than distance may also be factored in the selection of the emergency call service by the computer processing system 205.

The computer processing system 205 may be configured to process non-emergency SMS text messages without converting them into TTY format.

The TTY network interface 207 may be configured to deliver each of the converted emergency SMS text messages in TTY format to a TTY messaging system of an emergency call service, including to a public safety answering point (PSAP). Different routes may be used to effectuate this communication.

In one configuration, the TTY network interface 207 may be configured to deliver a converted emergency SMS text message in TTY format to a media gateway, such as to a media gateway 113. The media gateway may be configured to accept different TTY formats. Thereafter, the media gateway 113 may be configured to deliver the TTY encoded traffic to a selective router, such as to a selective router 115. The selective router may be configured to route the TTY traffic to the emergency call service which covers the region in which the mobile communication device is present. Thereafter, the selective router may be configured to establish a communication link with TTY equipment at the emergency call service, such as TTY equipment 119. The selective router may be configured to do so by calling the phone number of the TTY equipment using a public switch telephone network (PSTN), such as PSTN 117.

Upon receipt, the emergency call service may answer the call and cause the emergency SMS text message in TTY format to be displayed on a display, such as a display 121.

An operator at the emergency call service, such as an operator 122, may query an automatic location identification (ALI) system which includes an ALI (ALI DB), such as an ALI DB 123, seeking information about the location of the wireless mobile communication device which sent the emergency SMS text message. The ALI system, in turn, may communicate through an IP network which may include frame relay leased lines, such as an IP network 125, to query the emergency message handling system 111 for this location information. In turn, the computer processing system 205 may be configured to obtain this information by communicating with an LPS, such as the LPS 127.

The computer processing system 205 in the emergency message handling system 111 may in addition or instead be configured to seek the location information from the LPS 127 automatically, i.e., without a request from the ALI system. In this configuration, the computer processing system 205 may be configured to cause this automatically-sought location information to be provided to the ALI DB 123, thereby making it available at such time as the operator 122 requests it.

An emergency call service may wish to respond to a received emergency SMS text message. It may do so using the same TTY equipment, i.e., it may do so by sending a reply emergency text message in TTY format.

This reply TTY message may be routed through the PSTN 117, the selective router 115, the media gateway 113, and back to the TTY network interface 207 of the emergency message handling system 201. In this configuration, the TTY network interface 207 may be configured to receive emergency TTY text messages from emergency call services, each sent by the emergency call service to one of the wireless mobile communication devices. In turn, the computer processing system 205 may be configured to convert each received emergency TTY text message into SMS format using a TTY-to-SMS message converter 211.

The SMS message interface 203 may similarly be configured to deliver each of the converted TTY text messages in SMS format to the wireless mobile communication device to which it was sent. The SMS network interface 203 may be configured to do so by delivering the converted emergency TTY text messages to an SMPP gateway, such as to the SMPP gateway 109. In turn, the SMPP gateway 109 may be configured to deliver the converted emergency TTY text messages to an SMSC, such as to the SMSC 107. In turn, the SMSC 107 may be configured to deliver the converted emergency TTY text messages to an MSC/HLR, such as the MSC/HLR 105. In turn, the MSC/HLR 105 may be configured to deliver the converted emergency TTY text messages to a base station, such as to the base station 103. In turn, the base station 103 may be configured to deliver the converted emergency text messages to the wireless mobile communication device to which the converted emergency TTY text messages were sent.

The computer processing system 205 may be configured to manage the connection between each of the wireless mobile communication devices and the emergency call service to which the emergency SMS text message from the wireless mobile communication device was sent. This may include, for example, setting up the connection and maintaining an open connection between the two systems, even if a connection with the wireless mobile communication device is dropped.

The emergency message handling system 201, including the computer processing system 205, the SMS network interface, and the TTY network interface, may include computer processing hardware and software configured to perform the functions described herein. This hardware and software may be located at a single location or distributed across multiple locations. The emergency message handling system 201 may be configured to manage non-emergency SMS text messages, which may not require the use of either the SMS-To-TTY message converter 209 or the TTY-To-SMS message converter 211.

Figure 3:
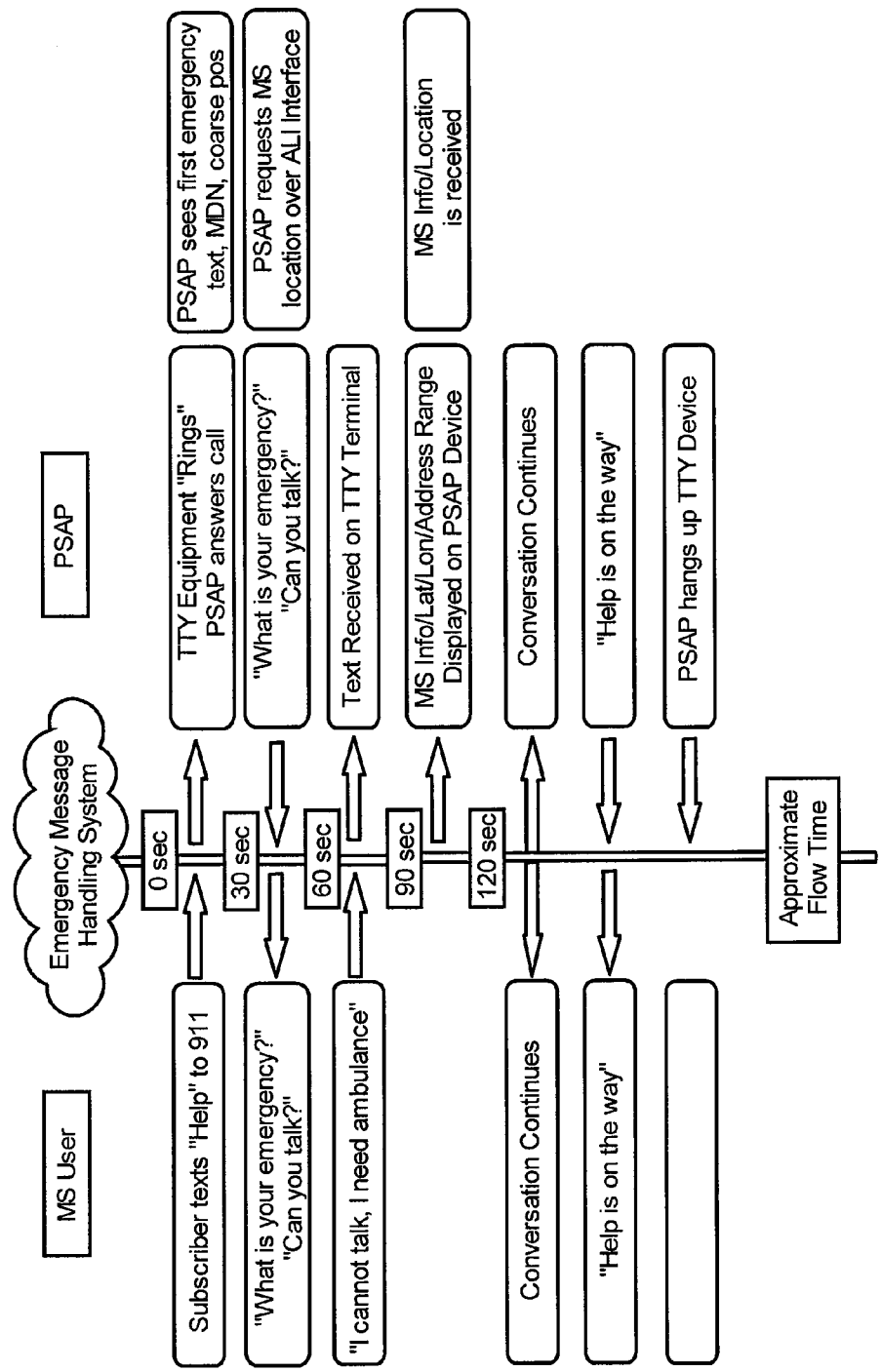
FIG. 3 is an example of an end user and an emergency call service experience when communicating emergency text messages.

FIG. 3 is an example of an end user and an emergency call service experience when communicating emergency text messages. The example illustrated in FIG. 3 may be implemented by the wireless network communication system illustrated in FIG. 1 and the emergency message handling system illustrated in FIG. 2 or by different systems. Similarly, the wireless network communication system illustrated in FIG. 1 and the emergency message handling system illustrated in FIG. 2 may implement a different user and/or call center experience.

The left column in FIG. 3 illustrates the user experience; the middle left column illustrates timing at the emergency message handling system; the middle right column illustrates the experience at the emergency call service (PSAP); and the right column describes the actions of the emergency call service (PSAP).

As illustrated in the left column of FIG. 3, a user may begin by entering an emergency SMS text message such as "Help" and by sending it to the emergency telephone number 911. This emergency SMS text message may be routed to the message handling system 111 through the route explained above and converted by the emergency message handling system 111 into TTY format. A phone call may then be placed to the TTY equipment 119 of the emergency call service. The emergency call service may then answer the call and receive delivery of the converted SMS text message in TTY format. This may be displayed on the display 121 to the operator 122, along with the phone number of the caller and the caller's course position. This coarse position may be the location of the base station which is communicating with the wireless mobile communication device.

The operator 122 may send back an emergency text message in TTY format, such as "What is your emergency? Can you talk?", as reflected in the middle right column of FIG. 3. This may be routed back to the emergency message handling system 111 through a path such as described above. The emergency message handling system 111 may then convert the emergency TTY text message to SMS format and deliver it back to the caller, again through a path such as described above.

During the communications, the emergency call service may seek more precise information about the location of the caller, such as by querying the ALI DB 123.

The exchange of emergency text messages may continue until the connection is broken, such as by the emergency call service hanging up its TTY device, as reflected in a step 307.

Figure 4:
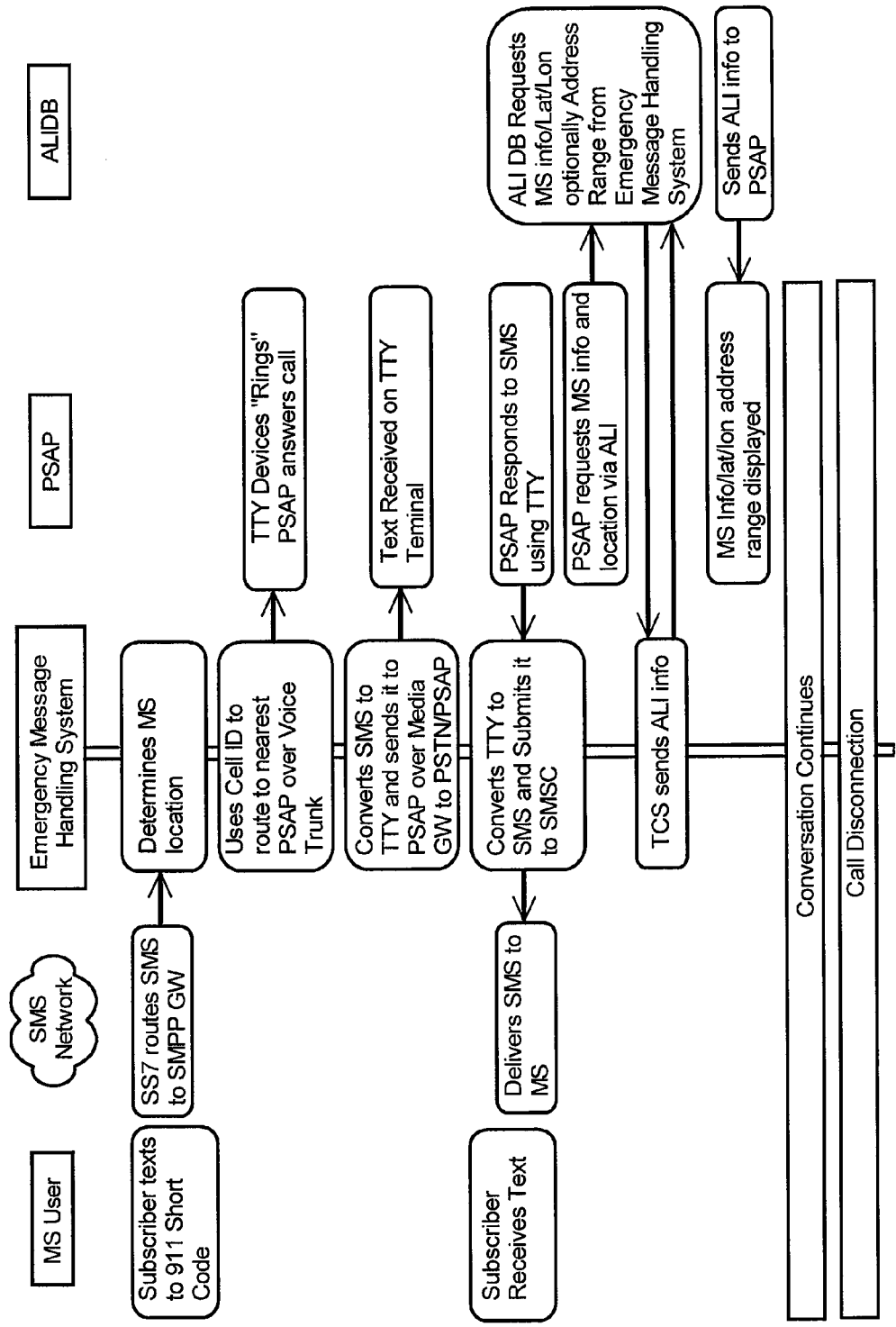
FIG. 4 is an example of high level call flow in connection with emergency text messages.

FIG. 4 is an example of high level call flow in connection with emergency text messages. The call flow illustrated in FIG. 4 may be implemented by the wireless network communication system illustrated in FIG. 1 and the emergency message handling system illustrated in FIG. 2 or by a different system. Similarly, the systems illustrated in FIGS. 1 and 2 may implement a high level call flow different than what is illustrated in FIG. 4.

The left column in FIG. 4 illustrates the user's actions; the middle left column illustrates activity on the SMS network; the middle column illustrates activity within the emergency message handling system; the middle right column illustrates activity at the emergency call service; and the right column illustrates activity at the ALI DB. As reflected in FIG. 4, the flow may be as described above.

Figure 5:
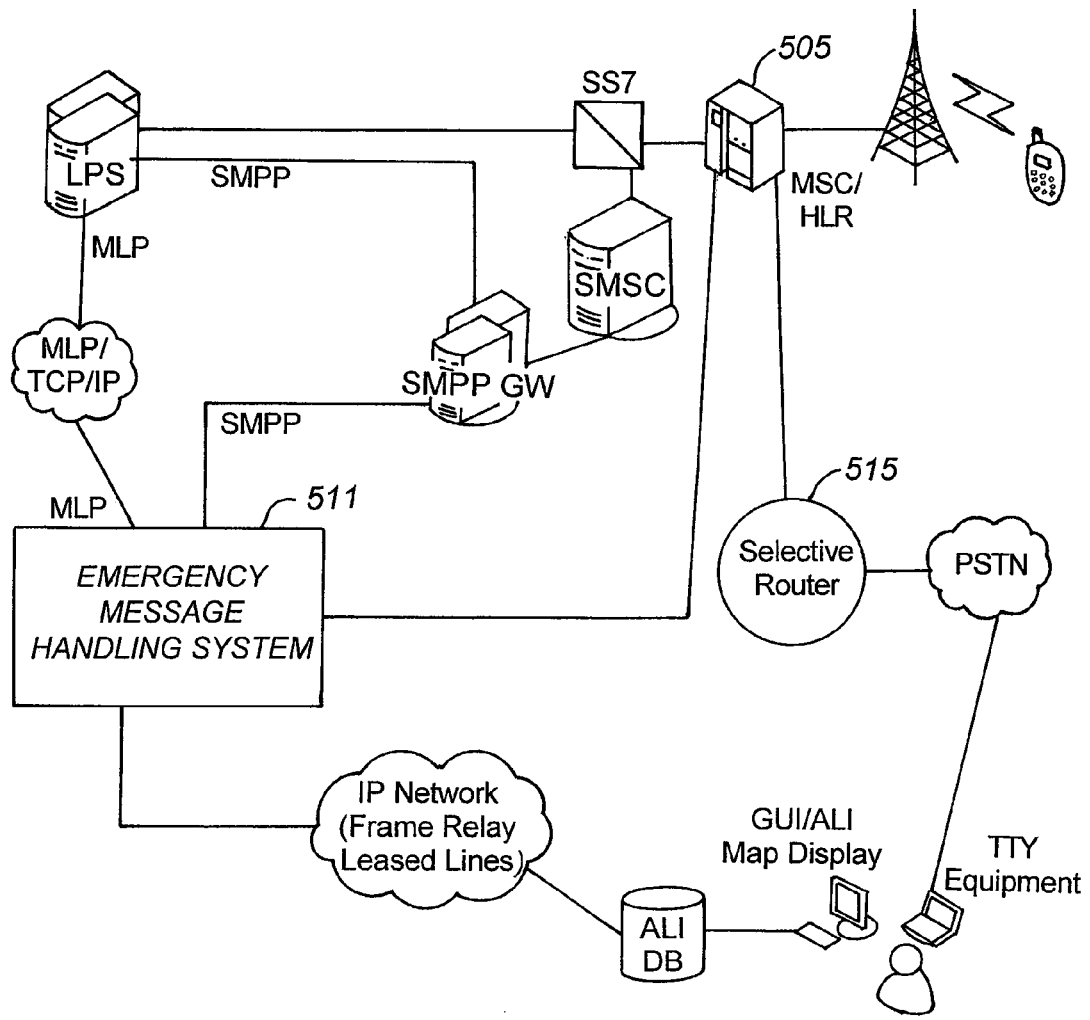
FIG. 5 is an example of an alternate configuration of a wireless network communication system which includes an emergency message handling system.

FIG. 5 is an example of an alternate configuration of a wireless network communication system which includes an emergency message handling system. It is the same as the configuration illustrated in FIG. 1, except that the converted SMS text messages in TTY format may be directed by an emergency message handling system 511 to an MSC, such as an MSC 505. In turn, the MSC 505 may direct these received, converted emergency SMS text messages in TTY format to a selective router, such as a selective router 515. The return TTY messages from the emergency call services may also follow this pathway in reverse, instead of the return pathway discussed above. All other aspects of the system illustrated in FIG. 5 may be the same as described above in connection with FIGS. 1-4.

The components, steps, features, objects, benefits and advantages which have been discussed are merely illustrative. None of them, nor the discussions relating to them, are intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

Unless otherwise stated, all measurements, values, ratings, positions, magnitudes, sizes, and other specifications which are set forth in this specification, including in the claims which follow, are approximate, not exact. They are intended to have a reasonable range which is consistent with the functions to which they relate and with what is customary in the art to which they pertain.

All articles, patents, patent applications, and other publications which have been cited in this disclosure are incorporated herein by reference.

The phrase "means for" when used in a claim is intended to and should be interpreted to embrace the corresponding structures and materials which have been described and their equivalents. Similarly, the phrase "step for" when used in a claim is intended to and should be interpreted to embrace the corresponding acts which have been described and their equivalents. The absence of these phrases in a claim mean that the claim is not intended to and should not be interpreted to be limited to any of the corresponding structures, materials, or acts or to their equivalents.

None of the claims are intended to embrace non-statutory subject matter, such as an abstract idea, law of nature or natural phenomena; obvious subject matter; nor subject matter lacking novelty, nor should they be interpreted in such a way. Any unintended embracement of such subject matter is hereby disclaimed.

Except as otherwise stated immediately above, nothing which has been stated or illustrated is intended or should be interpreted to cause a dedication of any component, step, feature, object, benefit, advantage, or equivalent to the public, regardless of whether it is recited in the claims.

The scope of protection is limited solely by the claims which now follow. That scope is intended and should be interpreted to be as broad as is consistent with the ordinary meaning of the language which is used in the claims when interpreted in light of this specification and the prosecution history which follows and to encompass all structural and functional equivalents.

The invention claimed is:

1. A system comprising:
an emergency message handling system for managing emergency short message service (SMS) text messages sent by wireless mobile communication devices, each to an emergency call service having a teletypewriter (TTY) messaging system, the emergency message handling system comprising:
   (a) a SMS network interface configured to receive the emergency SMS text messages using short message peer-to-peer protocol (SMPP) from an SMPP gateway;
   (b) a computer processing system including an SMS-To-TTY message converter configured to convert each of the emergency SMS text messages into a TTY format;
   (c) a TTY network interface configured to send each of the converted emergency SMS text messages in the TTY format for delivery to the TTY messaging system of the emergency call service to which the emergency SMS text message was sent;
a media gateway configured to receive each of the converted emergency SMS text messages in the TTY format from the TTY network interface of the emergency message handling system and deliver each of the converted emergency SMS text messages in the TTY format to a selective router; and
the selective router configured to receive each of the converted emergency SMS text messages in the TTY format from the media gateway and deliver each of the converted emergency SMS text messages in the TTY format to a public switched telephone network (PSTN) for delivery to the TTY messaging system of the emergency call service to which the emergency SMS text message was sent,
wherein the computer processing system is configured to manage one connection between each of the wireless mobile communication devices and the respective emergency call service to which any emergency SMS text message from each respective wireless mobile communication device was sent including maintaining the one connection open between the respective wireless mobile communication device and the respective emergency call service located closest to the respective wireless communication device to which the emergency SMS text message from the respective wireless mobile communication device was sent, even if a connection with the respective wireless mobile communication device is dropped.

2. The emergency message handling system of claim 1 wherein the emergency SMS text messages from the mobile communication devices were each designated by the mobile communication devices to be delivered to telephone number 911.

3. The emergency message handling system of claim 1 wherein the SMPP gateway is configured to receive the emergency SMS text messages from a short message service center (SMSC).

4. The emergency message handling system of claim 1 wherein the wireless mobile communication devices also send non-emergency SMS text messages to destinations other than an emergency call service and wherein the SMS network interface and the computer processing system are configured to process these non-emergency SMS text messages.

5. The emergency message handling system of claim 1 wherein each of the emergency SMS text messages are processed by a mobile station controller (MSC) and wherein the TTY network interface is configured to deliver each of the converted emergency SMS text messages in the TTY format to the MSC which processed the emergency SMS text message.

6. The emergency message handling system of claim 1 wherein the location of each of the wireless mobile communication devices is determined by a location platform server (LPS) and wherein the computer processing system is configured to request and obtain the location of each of the wireless mobile communication devices from the LPS and to deliver this location information to the emergency call service to which the emergency SMS text message from each wireless mobile communication device was sent.

7. The emergency message handling system of claim 6 wherein each of the emergency call services has an automatic location identification (ALI) system and wherein the computer processing system is configured to cause the location information to be sent to the ALI system of the emergency call service.

8. The emergency message handling system of claim 1 wherein the computer processing system is configured to determine which of several emergency call services is closest to the mobile communication device which sent the emergency SMS text message and wherein the TTY network interface is configured to deliver the converted emergency SMS text messages in the TTY format to that emergency call service.

9. The emergency message handling system of claim 1 wherein:
the TTY network interface is configured to receive emergency TTY text messages from each of the emergency call services, each sent by the emergency call service to one of the wireless mobile communication devices;
the computer processing system is configured to convert each received emergency TTY text message into a SMS format; and
the SMS network interface is configured to deliver each of the converted emergency TTY text messages in the SMS format to the wireless mobile communication device to which it was sent.

10. The emergency message handling system of claim 9 wherein the SMS network interface is configured to receive the emergency SMS text messages from and to deliver the converted emergency TTY text messages to an SMPP gateway.

11. The emergency message handling system of claim 10 wherein the SMPP gateway is configured to receive the emergency SMS text messages from and to deliver the converted emergency TTY text messages to a short message service center (SMSC).

12. The emergency message handling system of claim 9 wherein the TTY network interface is configured to deliver the converted emergency SMS text messages in the TTY format to and to receive the emergency TTY text messages in the TTY format from a media gateway.

13. The emergency message handling system of claim 9 wherein each of the emergency SMS text messages are processed by a mobile station controller (MSC) and wherein the TTY network interface is configured to deliver each of the converted emergency SMS text messages in the TTY format to and to receive each of the emergency TTY text messages in the TTY format from the MSC which processed the emergency SMS text message.

14. The emergency message handling system of claim 9 wherein the computer processing system is configured to manage the connection between each of the wireless mobile communication devices and the emergency call service to which the emergency SMS text message from the wireless mobile communication device was sent.

15. The emergency message handling system of claim 14 wherein the management includes setting up the connection.

16. An emergency message handling system for managing emergency short message service (SMS) text messages sent by wireless mobile communication devices, each to an emergency call service having a teletypewriter (TTY) messaging system, the emergency message handling system comprising:
a SMS network interface configured to receive the emergency SMS text messages using short message peer-to-peer protocol (SMPP) from an SMPP gateway;
a computer processing system including an SMS-To-TTY message converter configured to convert each of the emergency SMS text messages into a TTY format; and
a TTY network interface configured to deliver each of the converted emergency SMS text messages in the TTY format to the TTY messaging system of the emergency call service to which the emergency SMS text message was sent via a media gateway and a selective router over a public switched telephone network (PSTN), wherein:
each of the emergency call services has an automatic location identification (ALI) system,
the computer processing system is configured to request and obtain the location of each of the wireless mobile communication devices from a location platform server (LPS) and to deliver this location information to the ALI system of the emergency call service to which the emergency SMS text message from each wireless mobile communication device was sent, and
the computer processing system is further configured to manage one connection between each of the wireless mobile communication devices and the respective emergency call service to which any emergency SMS text message from each respective wireless mobile communication device was sent including maintaining the one connection open between the respective wireless mobile communication device and the respective emergency call service located closest to the respective wireless communication device to which the emergency SMS text message from the respective wireless mobile communication device was sent, even if a connection with the respective wireless mobile communication device is dropped.

17. An emergency message handling system for managing emergency short message service (SMS) text messages sent by wireless mobile communication devices, each to a respective emergency call service having a respective teletypewriter (TTY) messaging system, the emergency message handling system comprising:
a SMS network interface configured to receive each of the emergency SMS text messages using short message peer-to-peer protocol (SMPP) from an SMPP gateway;
a computer processing system including an SMS-To-TTY message converter configured to convert each of the emergency SMS text messages into a TTY format; and
a TTY network interface configured to deliver each of the converted emergency SMS text messages in the TTY format to the respective TTY messaging system of the respective emergency call service to which each of the emergency SMS text messages was sent via a media gateway and a selective router over a public switched telephone network (PSTN), wherein the computer processing system is configured to manage one connection between each of the wireless mobile communication devices and the respective emergency call-service to which any emergency SMS text message from each respective wireless mobile communication device was sent including maintaining the one connection open between the respective wireless mobile communication device and the respective emergency call service located closest to the respective wireless communication device to which the emergency SMS text message from the respective wireless mobile communication device was sent, even if a connection with the wireless mobile communication device is dropped.

* * * * *